US012649279B2

(12) United States Patent
Broughton et al.

(10) Patent No.: US 12,649,279 B2
(45) Date of Patent: Jun. 9, 2026

(54) SYNTHETIC BARRIER MATERIAL AND METHOD OF MANUFACTURE THEREOF

(71) Applicant: GRAPHITENE LIMITED, London (GB)

(72) Inventors: Simon Broughton, London (GB); Gaute Juliussen, London (GB); Qasim Malik, London (GB)

(73) Assignee: GRAPHITENE LIMITED, London (GB)

( * ) Notice: Subject to any disclaimer, the term of this patent is extended or adjusted under 35 U.S.C. 154(b) by 519 days.

(21) Appl. No.: 17/626,996

(22) PCT Filed: Jul. 16, 2020

(86) PCT No.: PCT/IB2020/056692
§ 371 (c)(1),
(2) Date: Jan. 13, 2022

(87) PCT Pub. No.: WO2021/009704
PCT Pub. Date: Jan. 21, 2021

(65) Prior Publication Data
US 2022/0362999 A1      Nov. 17, 2022

(30) Foreign Application Priority Data
Jul. 17, 2019      (GB) ..................................... 1910247

(51) Int. Cl.
*B32B 17/00*          (2006.01)
*B29C 64/30*          (2017.01)
(Continued)

(52) U.S. Cl.
CPC .............. *B29C 64/30* (2017.08); *B33Y 40/20* (2020.01); *B33Y 80/00* (2014.12); *B65D 65/40* (2013.01);
(Continued)

(58) Field of Classification Search
CPC .................................................. B32B 2264/00
See application file for complete search history.

(56) References Cited

U.S. PATENT DOCUMENTS

2015/0187456 A1      7/2015  Ji et al.
2016/0115324 A1      4/2016  Li et al.
(Continued)

FOREIGN PATENT DOCUMENTS

CA          2371258 A1 *  11/2000
CN          106674569 A  *   5/2017   .............. C08J 7/042
(Continued)

OTHER PUBLICATIONS

Barletta et al. Graphene reinforced UV-curable epoxy resins: Design, manufacture and material performance. Progress in Organic Coatings. vol. 90.Jan. 2016, pp. 414-424 (Year: 2016).*
(Continued)

*Primary Examiner* — Cachet I Proctor
(74) *Attorney, Agent, or Firm* — Ziegler IP Law Group, LLC.

(57) ABSTRACT

A synthetic barrier material includes a light-cured polymer and graphene nanoplatelets in parallel alignment in the polymer. Disclosed further is a method for manufacturing the synthetic barrier material. The graphene nanoplatelets are dispersed in a photocurable resin and polarically aligned by an electric field. Furthermore, disclosed is a synthetic barrier film manufactured from the aforementioned synthetic barrier material or the aforementioned method.

12 Claims, 3 Drawing Sheets

```
┌────────────────────────────────────────────┐
│     DISPERSE GRAPHENE NANOPLATELETS IN       │
│          PHOTOCURABLE RESIN                  │
│                  302                         │
└────────────────────────────────────────────┘
                      │
                      ▼
┌────────────────────────────────────────────┐
│   APPLY ELECTRIC FIELD TO POLARICALLY ALIGN  │
│  GRAPHENE NANOPLATELETS IN PHOTOCURABLE RESIN│
│                  304                         │
└────────────────────────────────────────────┘
```

(51) Int. Cl.

| | |
|---|---|
| *B33Y 40/20* | (2020.01) |
| *B33Y 80/00* | (2015.01) |
| *B65D 65/40* | (2006.01) |
| *B29C 64/106* | (2017.01) |
| *B29K 105/16* | (2006.01) |
| *B29K 507/04* | (2006.01) |
| *B29L 31/00* | (2006.01) |
| *B32B 17/10* | (2006.01) |
| *B32B 27/30* | (2006.01) |
| *B33Y 10/00* | (2015.01) |

(52) U.S. Cl.
CPC ...... *B29C 64/106* (2017.08); *B29K 2105/162* (2013.01); *B29K 2507/04* (2013.01); *B29L 2031/712* (2013.01); *B32B 17/00* (2013.01); *B32B 17/10* (2013.01); *B32B 27/304* (2013.01); *B32B 2255/10* (2013.01); *B32B 2255/26* (2013.01); *B32B 2255/28* (2013.01); *B32B 2264/108* (2013.01); *B32B 2264/302* (2020.08); *B32B 2264/401* (2020.08); *B32B 2315/08* (2013.01); *B32B 2327/18* (2013.01); *B32B 2439/00* (2013.01); *B33Y 10/00* (2014.12)

(56) References Cited

U.S. PATENT DOCUMENTS

| | | | | |
|---|---|---|---|---|
| 2017/0015483 A1* | 1/2017 | Park | ....................... | B82Y 40/00 |
| 2018/0179359 A1 | 6/2018 | Jnag et al. | | |
| 2018/0257297 A1* | 9/2018 | Matheu | ............... | A61L 27/3625 |

FOREIGN PATENT DOCUMENTS

| | | | |
|---|---|---|---|
| CN | 106977665 A | | 7/2017 |
| CN | 107090252 A | * | 8/2017 |
| CN | 107513137 A | | 12/2017 |
| EP | 3121329 A1 | | 1/2017 |
| IN | 107090252 A | | 8/2017 |

OTHER PUBLICATIONS

Lopez et al. Detailed Investigation into the Preparation of Graphene Oxide by Dichromate Oxidation. Chemistry select. vol. 3, Issue 24. Jun. 2018. pp. 6972-6978 (Year: 2018).*

Chiong et al. Novel hydrophobic PVDF/APTES-GO nanocomposite for natural gas pipelines coating. Journal of Natural Gas Science and Engineering .vol. 42.Jun. 2017, pp. 190-202 (Year: 2017).*

Wu et al. Aligning multilayer graphene flakes with an external electric field to improve multifunctional properties of epoxy nanocomposites. Carbon. vol. 94, Nov. 2015, pp. 607-618 (Year: 2015).*

Sheshmani et al. Suitable Chemical Methods for Preparation of Graphene Oxide, Graphene and Surface Functionalized Graphene Nanosheets. Acta Chim. Slov. 2013, 60, 813-825 (Year: 2013).*

Jun et al. A study on the effects of graphene nano-platelets (GnPs) sheet sizes from a few to hundred microns on the thermal, mechanical, and electrical properties of polypropylene (PP)/GnPs composites. eXPRESS Polymer Letters vol. 12, No. 10 (2018) 885-897 (Year: 2018).*

Liu et al. Temperature dependence of the viscosity of epoxy acrylate-tripropylene glycol diacrylate binary mixtures. De Gruyter. Aug. 15, 2015 (Year: 2015).*

Yang et al. Electrically assisted 3D printing of nacre-inspired structures with self-sensing capability. Science Advances. vol. 5. pp. 1-10. Apr. 4, 2019 (Year: 2019).*

Xiang et al., "Stiff and Transparent Multilayer Thin Films Prepared Through Hydrogen-Bonding Layer-by-Layer Assembly of Graphene and Polymer", Advanced Functional Materials, vol. 26, No. 13, ISSN: 1616-301X, DOI: 10.1002/adfm.201504758, Feb. 8, 2016, 7 pages.

Chiong et al., "Novel hydrophobic PVDF/APTES-GO nanocomposite for natural gas pipelines coating", Journal of Natural Gas Science And Engineering, Elsevier, Amsterdam, NL, vol. 42, ISSN: 1875-5100, DOI: 10.1016/J.INGSE.2017.02.042, Mar. 24, 2017, 32 pages.

Jun et al., "A study on the effects of graphene nano-platelets (GnPs) sheet sizes from a few to hundred microns on the thermal, mechanical, and electrical properties of polypropylene (PP)/GnPs composites" in eXPRESS Polymer Letters, vol. 12, No. 10, ISSN: 1788-618X, DOI: 10.3144/expresspolymlett.2018.76, Jan. 1, 2018, 13 pages.

Hazarika et al., "High-Performing Biodegradable Waterborne Polyester/Functionalized Graphene Oxide Nanocomposites as an Eco-Friendly Material", ACS Omega, vol. 3, No. 2, ISSN: 2470-1343, DOI: 10.1021/acsomega.7b01551, Feb. 26, 2018, 12 pages.

Lin et al., published "Planar Alignment of Graphene Sheets by a Rotating Magnetic Field for Full Exploitation of Graphene as a 2D Material", Advance Functional Materials, vol. 28, No. 46, Sep. 25, 2018, ISSN: 1616-301X, DOI: 10.1002/adfm.201805255, 7 pages.

Serodre et al., "Surface Silanization of Graphene Oxide Under Mild Reaction Conditions", Journal of The Brazilian Chemical Society, ISSN: 0103-5053, DOI: 10.21577/0103-5053.20190167, Jan. 1, 2019, 12 pages.

Massimiliano et al., "Graphene reinforced UV-curable epoxy resins: Design, manufacture and material performance", Progress in Organic Coatings, vol. 90, ISSN: 0300-9440, DOI: 10.1016/J.PORGCOAT. 2015.08.013, Sep. 7, 2015, 11 pages.

GB Intellectual Property Office, Combined Search and Examination Report, No. GB1910247.4, mailed Feb. 3, 2020, 7 pages.

International Search Report and Written Opinion of the International Searching Authority, European Patent Office, Application No. PCT/IB2020/056692, Dec. 2, 2020, 15 pages.

* cited by examiner

ELECTRIC FIELD

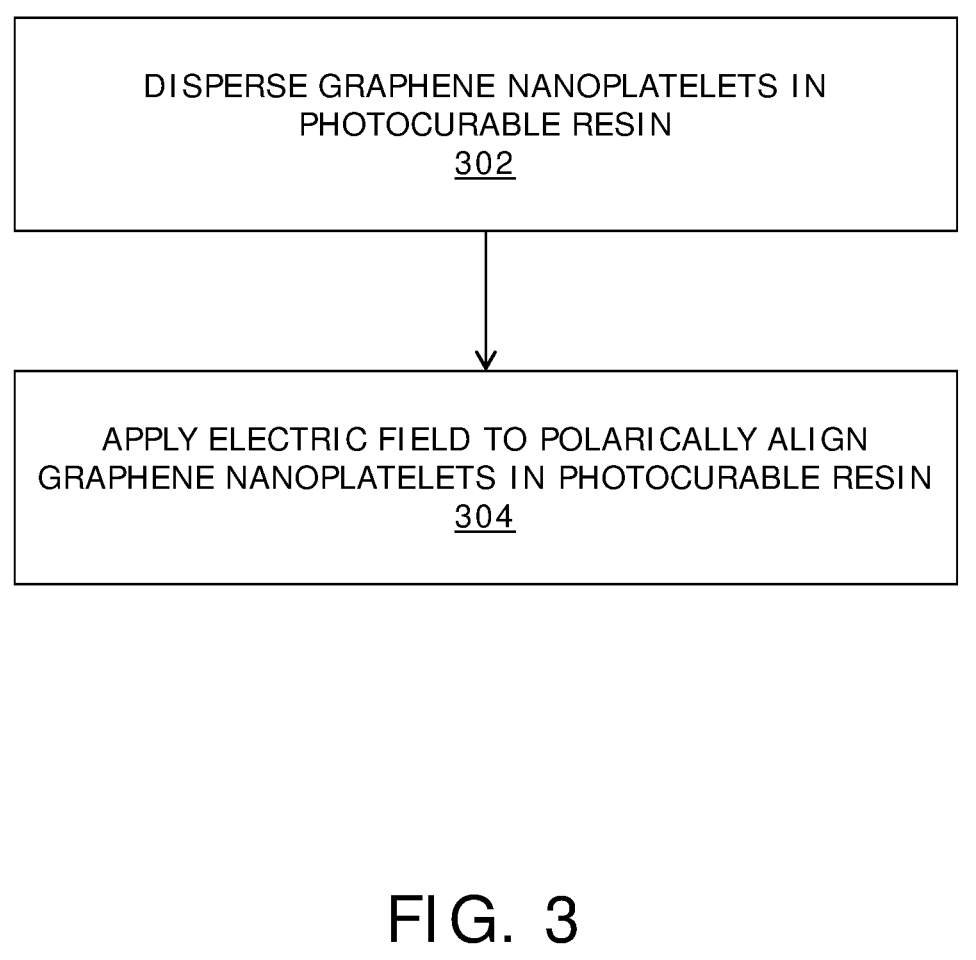

```
┌─────────────────────────────────────────────┐
│                                             │
│   DISPERSE GRAPHENE NANOPLATELETS IN        │
│         PHOTOCURABLE RESIN                  │
│                 302                         │
│                                             │
└─────────────────────────────────────────────┘
                      │
                      ▼
┌─────────────────────────────────────────────┐
│                                             │
│   APPLY ELECTRIC FIELD TO POLARICALLY ALIGN │
│  GRAPHENE NANOPLATELETS IN PHOTOCURABLE RESIN│
│                 304                         │
│                                             │
└─────────────────────────────────────────────┘
```

FIG. 3

SYNTHETIC BARRIER MATERIAL AND METHOD OF MANUFACTURE THEREOF

TECHNICAL FIELD

The present disclosure relates generally to packaging material, and more specifically to synthetic barrier material. Moreover, the present disclosure is concerned with methods of manufacturing the aforementioned synthetic barrier material. Furthermore, the present disclosure is concerned with manufacture of synthetic barrier film material using the aforementioned synthetic barrier material or the aforementioned method.

BACKGROUND

Globally, the packaging industry employs a variety of packaging materials for packaging different types of products. Such packaging materials include plastics, metals, alloys, paper, cardboard, wood or any combination thereof. Packaging materials form a protective lining, mostly as an outermost layer, and act as a barrier between external environment and packaged content for convenient storage, transportation, distribution and sale. In particular, packaging materials provide a protection to the packaged content against factors such as pollution, rain, moisture, chemicals, gases and/or wear and tear due to mechanical stress. Therefore, the choice of a reliable packaging material is very important while packaging different types of products therein to ensure an effective utility of the packaged product. Currently, plastics are indispensably used as packaging materials to manufacture packaging products such as packaging films, packaging boxes and the like. For example, packaging material such as polyethylene may be used to manufacture a packaging film for storing a liquid product to ensure waste-free transportation and sale of the liquid product.

In recent times, various grades of plastics have been developed for packaging. However, most packaging materials, including thermoplastics such as polyethylene tereph-thalate or polypropylene, used in packaging are non-biodegradable and often, are very difficult to recycle. Therefore, packaging products, manufactured using such packaging materials, often end up as litter and are dumped in landfills and/or water bodies. Such disposal of packaging products has severe environmental consequences. For instance, plastics dumped in water bodies, such as river and oceans, affect the nutrient uptake of the aquatic animals dwelling therein, and indeed cause more serious harm to aquatic animals. Moreover, the majority of packaging products, particularly in high growth markets, contain multiple materials to impart the desired barrier and mechanical properties to the packaging material. Multiple materials in packaging products renders the packaging material incompatible with the current recycling schemes and subsequently contribute to untreated dumping in landfills and/or water bodies.

With increasing focus on eco-friendly materials and environment concerns, techniques have been developed to manufacture degradable and/or recyclable packaging materials. However, such degradable materials are often mechanically weak. Consequently, to make up for the lack of strength, the thickness of the material is required to be increased, leading to higher material and transportation costs and a less sustainable lifestyle of the material. Conventional techniques like vacuum filtration, spray coating, ice tem-plating and self-assembly were able to produce two-dimensional thin-film plastics or simple bulk structures. However, a lack in sufficient barrier properties of such materials limited their use to only lower-value applications, for example disposable cups and cutlery.

Therefore, in light of the foregoing discussion, there exists a need to overcome the aforementioned drawbacks associated with conventional packaging materials.

SUMMARY

The present disclosure seeks to provide a synthetic barrier material. The present disclosure also seeks to provide a method of manufacturing the aforementioned synthetic barrier material. The present disclosure seeks to provide a solution to the existing problem of non-recyclable and non-degradable plastics, and less sustainable lifecycle of such plastics. The present disclosure further seeks to provide a reliable, strong and eco-friendly synthetic material.

In one aspect, an embodiment of the present disclosure provides a synthetic barrier material comprising light-cured photopolymer and graphene nanoplatelets, wherein the graphene nanoplatelets are in substantially parallel alignment in the light-cured photopolymer.

An aim of the present disclosure is to provide a solution that overcomes at least partially the problems encountered in prior art, and to provide improved and reliable plastics that are recyclable, degradable, durable, sustainable, light-weight packaging material; moreover, employs aligned graphene nanoplatelets to provide higher mechanical strength and barrier properties.

Optionally, the graphene nanoplatelets are substantially separated by light-cured photopolymer.

Optionally, the graphene of the graphene nanoplatelets comprises a grafted functionalized alkyl silyl group.

Optionally, the photocurable resin comprises styrenic, acrylic of vinylic polymer.

Optionally, each graphene nanoplatelet has a thickness in a range of 5-10 nanometres and a diameter in a range of 15-50 micrometres.

Optionally, the synthetic barrier material has a graphene nanoplatelets content in the range 1 to 5% by weight, for example 2% by weight.

In another aspect, an embodiment of the present disclosure provides a method of manufacturing a synthetic barrier material, the synthetic barrier material comprising graphene nanoplatelets, wherein the method comprises:

dispersing the graphene nanoplatelets in a photocurable resin; and applying an electric field to polarically align the graphene nanoplatelets in the photocurable resin.

Optionally, the method further comprises pre-treating the graphene nanoplatelets using a chemical treatment process, wherein the chemical treatment process comprises: treating virgin graphene nanoplatelets with mineral acid in the presence of an oxidizing agent for pre-determined time period at pre-determined temperature; filtering the treated virgin graphene nanoplatelets; dispersing the filtered graphene nanoplatelets in water to obtain a nanoplatelet suspension; dissolving a functionalized alkyl silane ester in a water-miscible non-aqueous solvent to obtain a silane solution and combining the nanoplatelet suspension with the silane solution to obtain grafted graphene nanoplatelets. The grafted graphene nanoplatelets are then used as graphene nanoplatelets in the method of the previous paragraph.

Optionally, the photocurable resin comprises styrenic, acrylic or vinylic monomers or oligomers thereof and a photoinitiator.

Optionally, each graphene nanoplatelet has a thickness in a range of 5-10 nanometres and a diameter in a range of 15-50 micrometres.

Optionally, the synthetic barrier material has a graphene nanoplatelets content of 1 to 5% by weight, for example 2% by weight.

Optionally, the method comprises generating the electric field by using a direct-current voltage, wherein the electric field generated is in the range 100 to 1000 Volts/centimetre, for example 433 Volts/centimetre.

In yet another aspect, an embodiment of the present disclosure provides synthetic barrier film manufactured using the aforementioned synthetic barrier material or obtained by performing the aforementioned method.

Embodiments of the present disclosure substantially eliminate or at least partially address the aforementioned problems in the prior art, and provides a synthetic barrier material with improved mechanical performance (both strength and toughness) combined with superior water and oxygen barrier properties. The disclosed synthetic barrier material may be further used to manufacture an electrically self-sensing three-dimensional synthetic barrier film for use as effective and convenient packaging material or as three-dimensional architectures.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3 is an illustration of steps of a method of manufacturing the synthetic barrier material, in accordance with an embodiment of the present disclosure.

Figure 1:
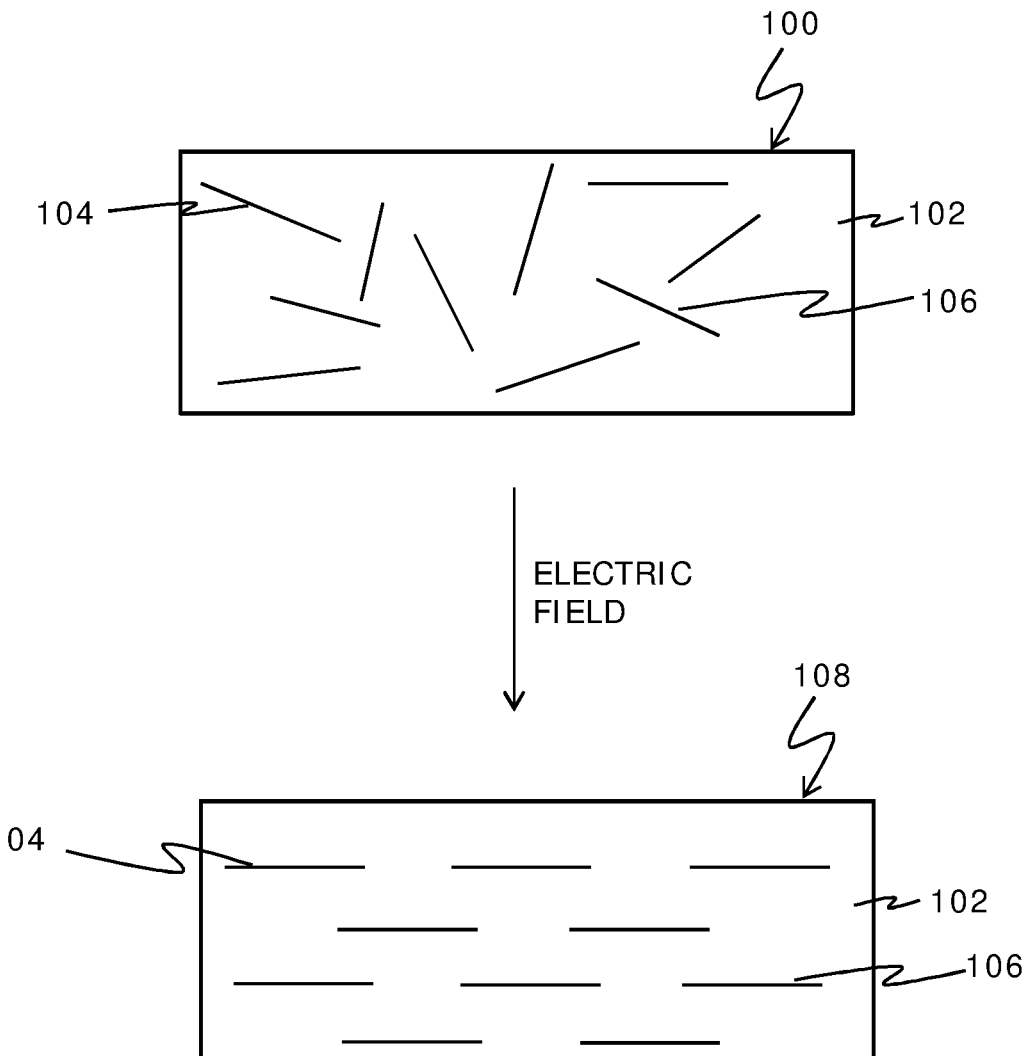
FIG. 1 is a schematic illustration depicting alignment of graphene nanoplatelets in photocurable resin upon application of electric field to obtain a synthetic barrier material, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides the aforementioned synthetic barrier material with improved mechanical performance (both strength and toughness). The disclosed synthetic barrier material is highly efficient as a packaging material and may be developed as complex three-dimensional structures of varying shapes and sizes by using a three-dimensional printing process. The three-dimensional printing process enables designing and fabrication of smart structures that are light weight yet strong for various potential applications. Moreover, the disclosed synthetic barrier material maintains high sustainable product lifecycle combined with superior water and oxygen barrier properties. Beneficially, the three-dimensional structures manufactured using the synthetic barrier material possess a self-sensing capability. Self-sensing capability of such materials is useful for applications requiring integrity of sealing, leak and/or crack (or deformation) detection or tamper-proofing. Additionally, the aforementioned synthetic barrier material provides an environment-friendly alternative to conventional plastics, and may be exploited either in recyclable or biodegradable materials.

The present disclosure provides the synthetic barrier material. Throughout the present disclosure, the term "synthetic barrier material" refers to an artificially-made material providing barrier properties. Herein, barrier properties refer to an ability of the material to prevent any of: (a) movement of substances on a given side to the other side of the material; and/or (b) access to substances on a given side from the other side of the material. Notably, the synthetic barrier material can be employed for a variety of applications such as manufacture of packaging products such as films, containers; coating of products such as helmets, protective gears; or developing three-dimensional structures.

Throughout the present disclosure, the term "photocurable resin" refers to a photopolymer resin that changes properties upon being exposed to light. Such exposure to light, polymerizes monomers or cross-links oligomers resulting in hardening of the photocurable resin, providing a "light-cured photopolymer", and thereby imparting mechanical strength to the synthetic barrier material. Such hardening of the photocurable resin through cross-linking or polymerization is generally referred to as "curing". Herein, resin refers to a synthetic, polymeric, viscous compound that can be cured to obtain a hardened structure. Optionally, the light for photocuring may be of an ultraviolet (UV) range or of a visible range of electromagnetic spectrum.

In an embodiment, the photocurable resin may comprise a styrenic, acrylic or vinylic monomer, in other words the photocurable resin may comprise chemicals having structural elements based respectively on styrene, an acrylic moiety or a vinyl moiety. The styrenic monomer may be styrene. The acrylic monomer may be an acrylic acid ester, e.g. methyl acrylate, or an alkylacrylic acid ester, e.g. methyl methacrylate, or may have another group, e.g. ethylene glycol, ethylene oxide bi-substituted with acrylic groups to participate in the polymerization. The vinylic group could be ethylene, propylene or substituted ethylene or propylene. The photocurable resin may comprise oligomers of the styrenic, acrylic or vinylic monomers. The curing process may result in cross-linking of the oligomers. Preferably, the photocurable resin may further comprise a photo-initiator, e.g. benzoyl peroxide, an azo material including a —N═N— group or an organic cationic salt. The photocurable resin may be at least one of: a standard resin, a grey resin, a mammoth resin, a transparent resin, a high-detail resin, a black resin, a G+® resin, a bioresin, Acrylonitrile Butadiene Styrene, Glycol-modified Polyethylene Terephthalate, Polyethylene Terephthalate, polypropylene, polystyrene, polyvinyl alcohol, nylon 6,6. Standard Resin is a cost-effective translucent photocurable resin that has a high level of detail for a quality product, that is smooth to the touch and easy to paint and post-process, and typically comprises methacrylic acid esters and a photo-initiator. Grey resin (also known as Prime Grey) is a very smooth resin and easy to paint, and comprises acrylic oligomers and a photo-initiator. Other colours resins may be black resin, white resin, red resin, orange resin, brown resin and so forth. Notably, the colour of the resin affects its properties. For example, grey resin is suitable for material that has a high level of detail while white resin may be better suitable for a smooth surface. Mammoth Resin enables printing larger products, for example a size 2100×700×800 millimetre (mm), with high quality and smoothness. Transparent Resin enables printing a transparent material that is water-resistant and ideal for smaller models requiring a smooth, high-quality transparent surface. High-Detail Resin produces ultra-thin layers of resin onto a building platform. Moreover, each layer of resin is immediately hardened by a light source, such as a UV light. This process is continued layer by layer until the model is completed, that has a high level of detail and a smooth surface. Copolymers, such as Acrylonitrile Butadiene Styrene (ABS) and Glycol-modified Polyethylene Terephthalate (PETG) may be beneficial as they combine the desirable properties of each of the monomers and alleviate the undesirable properties of some monomers. For example, PETG comprises Cyclohexane dimethanol copolymerised with a polymer PET to reduce the printing temperature of PET and make easier to print with. Bioresins, such as dental and medical resins, are biocompatible and find application in custom-make medical equipment, for example reusable surgical guides and appliances, dental applications, fracture and wear-resistant medical parts, hard splints, retainers, non-invasive and/or invasive devices, implantable devices, and the like. The G+® resin (product of MakerJuice Labs LLC) possesses excellent mechanical properties, and is preferably used in the synthetic barrier material. The G+® resin comprises high tensile epoxy diacrylate, glycol diacrylate and a photo-initiator that imparts the G+® resin with excellent mechanical properties. Moreover, the G+® resin has a favourably low viscosity that is 90 centipoises at 20° C., that further assists in a speedy curing of the photocurable resin. The photocurable resin may be any resin suitable for 3D printing involving light curing. Polymerization of the photocurable resin results in light-cured photopolymer, in particular if the polymerization is initiated by exposure to light.

Moreover, the synthetic barrier material comprises the graphene nanoplatelets. The graphene nanoplatelets are typically short stacks of polygonal platelet-shaped graphene sheets in a planar structure. Due to a unique size and morphology, the graphene nanoplatelets possess enhanced barrier properties and excellent mechanical properties such as toughness, strength, and surface hardness. It will be appreciated that the graphene nanoplatelets possess a purely graphitic component of structure, therefore, the graphene nanoplatelets are excellent electrical and thermal conductors.

In an embodiment, each of the graphene nanoplatelets has a thickness in a range of 5-10 nanometres and a diameter in a range of 15-50 micrometres. In an example, the thickness may be from 5, 6, 7, 8 or 9 nanometres up to 6, 7, 8, 9 or 10 nanometres. In an example, the diameter may be from 15, 20, 25, 30, 35, 40 or 45 micrometres up to 20, 25, 30, 35, 40, 45 or 50 micrometres.

In an embodiment, each of the graphene nanoplatelets has a thickness in a range between approximately 1 nanometre to 5 nanometres. In an embodiment, each of the graphene nanoplatelets has at least 2 graphene layers (monolayers). In an embodiment, each of the graphene nanoplatelets has a diameter in the range of approximately 1 micrometre to 15 micrometres. Smaller graphene nanoplatelets move or turn more easily when in a solution or when in a dispersion. In particular smaller graphene nanoplatelets move or turn more easily laterally, for example when present in resins, and in particular resins of slightly higher viscosity than the average viscosity of commonly used resins for dispersing graphene nanoplatelets. The easier movement or the easier turning of the graphene nanoplatelets is beneficial for example when a process for forming continuous (or approximately continuous) sheet in a photo-curable resin.

In an embodiment, the synthetic barrier material has a graphene nanoplatelets content in the range 1% to 5% by weight, for example 2% by weight. In that example the content of the graphene nanoplatelets in the synthetic barrier material is 2% by weight and the photocurable resin has a content of 98% by weight in the synthetic barrier material. It will be appreciated that the presence of the graphene nanoplatelets in the light-cured photopolymer helps the synthetic barrier material achieve mechanical strength and possess excellent barrier properties. Additionally, the synthetic barrier material with 1 to 5% by weight graphene nanoplatelets shows significantly improved electrical conductivity.

Optionally, the graphene nanoplatelets are pre-treated using a chemical treatment process, wherein the chemical treatment process comprises:

treating virgin graphene nanoplatelets with mineral acid, e.g. sulphuric acid in presence of an oxidizing agent, e.g. potassium dichromate or potassium permanganate for pre-determined time period at pre-determined temperature;

filtering the treated virgin graphene nanoplatelets; and dispersing filtered graphene nanoplatelets in water;

dissolving functionalized alkyl silane e.g. 3-aminopropyltriethoxysilane in a water-soluble non-aqueous solvent, e.g. acetone and combining the dispersed nanoplatelets with the dissolved functionalized alkyl silane to obtain at least one grafted layer of functionalized alkyl silyl groups on the graphene of the graphene nanoplatelets. Preferably the functionalized alkyl silyl groups are 3-aminopropylsilyl groups. However, other functionalized alkyl silyl groups are possible. These include ethyl, propyl, isopropyl, butyl or pentyl groups as the alkyl group, and amino or hydroxy substituted alkanes attached to the silicon atom, and further optionally including an additional alkyl group selected from methyl or ethyl attached to the silicon atom. The remainder of the silicon atom valency (=4) is typically substituted with hydrolysable methoxy or ethoxy groups.

Generally, the mineral acid is used in high concentration, e.g. 10 N or higher, such that the oxidizing properties are strong enough to modify a graphitic surface. If the mineral acid is Nitric acid, it may be possible to modify a graphitic surface without addition of a further oxidizing agent.

Optionally in this regard, the graphene nanoplatelets may be treated chemically in order to be used in the synthetic barrier material. Notably, the chemical treatment provides additional mechanical strength and barrier properties to the graphene nanoplatelets. Moreover, the chemical treatment strengthens the interface and load transfer at sandwich-like polymer matrix of the synthetic barrier material. Specifically, the chemical treatment comprises treating the virgin graphene nanoplatelets with 30 millilitres (ml) of 10N sulphuric acid in the presence of 1 gram (g) of potassium dichromate for the pre-determined time period and the pre-determined temperature. Optionally, the pre-determined time period is 1 hour. More optionally, the pre-determined temperature is 80° C. It will be appreciated that the virgin graphene nanoplatelets refer to the graphene nanoplatelets in a raw form. Moreover, the chemical treatment process may comprise a step of filtering the treated virgin graphene nanoplatelets. The treated virgin graphene nanoplatelets are filtered and washed with hot water and cold water alternatively several times to remove chromic acid. Notably, the chromic acid is formed as a by-product of treating the virgin graphene nanoplatelets in the presence of potassium dichromate. Optionally, the filtered and washed virgin graphene nanoplatelets are then dried in oven at a temperature of 90° C.

Furthermore, optionally, the chemical treatment process comprises dispersing filtered graphene nanoplatelets in water and dissolving the 3-aminopropyltriethoxysilane in acetone, then combining the dispersed nanoplatelets with the dissolved silane to obtain at least one grafted layer of 3-aminopropyltriethoxysilane on the graphene nanoplatelets. The dispersed graphene nanoplatelets are stirred for 1 hour at a temperature of 80° C. Optionally, the resultant graphene nanoplatelets are then filtered and washed with acetone to obtain the at least one grafted layer of 3-APTES on the graphene nanoplatelets. Notably, the at least one grafted layer of 3-APTES on the graphene nanoplatelets strengthen the interface and load transfer, thereby providing additional mechanical strength to the synthetic barrier material.

The present disclosure further provides the method of manufacturing a synthetic barrier material. The method comprises dispersing the graphene nanoplatelets in the photocurable resin. The photocurable resin, preferably in a liquid form is spread over a platform, for example, a glass substrate. The graphene nanoplatelets, are dispersed in the photocurable resin spread over the platform. Subsequently, the aforementioned dispersion of the graphene nanoplatelets is iterated to obtain multiple layers of photocurable resin sandwiched between graphene nanoplatelets. Optionally, the glass substrate is a polytetrafluoroethylene (PTFE) film on top of a glass. PTFE film is extremely durable and provides strength to the glass and prevents it from chemical damaging and/or cracking or breaking. Moreover, PTFE has a very low coefficient of friction, therefore resists solids to stick on it. Furthermore, PTFE is hydrophobic and thus provides high resistance to moisture or flowing liquids. Alternatively, the glass substrate may be a silicone-coated glass substrate, a PTFE glass mesh, a PEEK-coated glass substrate, and the like. Alternatively, optionally, the platform may be a PTFE-coated carbon material, a PTFE-coated graphite material, a PTFE-coated bronze material, a PTFE-coated metal, an all-metal design, such as stainless steel, and so forth.

Moreover, the graphene nanoplatelets are polarically aligned in the photocurable resin in the synthetic barrier material. The aforementioned method of manufacture of synthetic barrier material comprises applying an electric field to polarically align the graphene nanoplatelets in the photocurable resin. Notably, the graphene nanoplatelets are polarically aligned using an electric field applied horizontally across the photocurable resin comprising graphene nanoplatelets dispersed therein, for example by providing opposed electrode plates on inside vertical surfaces of a glass tank containing the photocurable resin comprising graphene nanoplatelets dispersed therein. Upon application of the electric field, each of the graphene nanoplatelets develop a positive charge at one end and a slightly negative charge at the other end. The two electrically charged regions on either end of the graphene nanoplatelet are called poles (or dipoles). The dipolar graphene nanoplatelets orient themselves with the positive ends of the graphene nanoplatelets being attracted to the negative ends of the graphene nanoplatelets, and vice-versa. Such attraction of opposite poles results in polaric alignment of the graphene nanoplatelets, in each layer, substantially parallel to each other in the photocurable resin. Thus, the platelets first align horizontally, and are then pulled together to make an end-to-end connection, upon application of an electrical field in the direction of the alignment of graphene nanoplatelets. The latter facilitates the improved barrier properties and the conductivity (both electrical and thermal). The 3-D printed lightweight, smart armour aligned graphene nanoplatelets can be used to sense surface damage to exert resistance change during electrical applications, thereby adding intelligence or self-sensing capabilities to the synthetic barrier material.

It will be appreciated that the two-dimensional (2D) graphene nanoplatelets have shape anisotropy, therefore, a polarization moment parallel to the graphene nanoplatelet is much higher than a polarization moment perpendicular to the graphene nanoplatelet. Such a difference in the polarization moments leads to a rotation of the graphene nanoplatelets in the photocurable resin. Once rotated, the polarized graphene nanoplatelets tend to attract each other due to the opposite charges presented at their respective ends and, therefore the charges in the graphene nanoplatelets align polarically when subjected to the electric field.

In an embodiment, the method comprises generating the electric field by using a direct-current voltage of 1300 Volts (V), and wherein the electric field generated is 433 Volts/centimetre (V/cm) by employing two electrodes separated, for example, by a distance of 3 cm. The direct-current voltage of 1300 V is fed to the synthetic barrier material comprising the photocurable resin and the graphene nanoplatelets. The electric field of 433 V/cm is generated across the synthetic barrier material due to the direct-current voltage of 1300 V. Subsequently, the graphene nanoplatelets polarically align themselves in the photocurable resin, in presence of the electric field.

In an embodiment, the graphene nanoplatelets are aligned at a predefined gap in the photocurable resin, once subjected to the electric field. Such an alignment is similar to brick and mortar architecture, where the photocurable resin acts as the mortar, and the aligned graphene nanoplatelets acts as the bricks separated by the photocurable resin, optionally 5-15 nm thick. The brick and mortar architecture of the synthetic barrier material results in parallel and closely packed graphene nanoplatelet layers that are structurally separated by the light-cured photopolymer in between as mortar to impart critical structural features for mechanical performance and barrier properties once the photocurable resin has been cured. It will be appreciated that the graphene nanoplatelets exhibit high in-plane rigidity and substantial out-of-plane flexibility, therefore, the strength and efficiency thereof is affected by their arrangement. The brick and mortar arrangement provide enhanced mechanical strength to the synthetic barrier material. Beneficially, the graphene nanoplatelets may carry a majority of load, when the graphene nanoplatelets are polarically aligned (such as parallelly and closely placed) in the light-cured photopolymer.

Furthermore, disclosed is a synthetic barrier film manufactured using the synthetic barrier material, or obtained by performing the method of manufacturing the synthetic barrier material. The term "synthetic barrier film" as used herein refers to a polymeric layer comprising the photocured synthetic barrier material. The synthetic barrier film exhibits improved mechanical properties, and water and oxygen barrier properties. Furthermore, the synthetic barrier film is obtained by performing the method of manufacturing the synthetic barrier material (as described in detail hereinabove).

In an embodiment, the synthetic barrier film is manufactured from the synthetic barrier material using an electrically-assisted three-dimensional printing process. The electrically-assisted three-dimensional (3D) printing process takes place in a tank, such as a glass tank. The photocurable resin in a liquid form, is filled and spread over the glass tank. The graphene nanoplatelets are dispersed in the photocurable resin. The graphene nanoplatelets dispersed in the photocurable resin are subjected to the direct-current voltage of 1300 V, to generate the electric field of 433 V/cm in order to polarically align the graphene nanoplatelets in the photocurable resin. As mentioned above, the electric field of 433 Volts/centimetre (V/cm) is generated by employing two electrodes separated, for example, by a distance of 3 cm. Once the graphene nanoplatelets are polarically aligned in the photocurable resin, the graphene nanoplatelets dispersed in the photocurable resin is subjected to the light to initiate the process of photocuring to light-cured photopolymer. After the first layer of the synthetic barrier material is cured on a platform, optionally a glass substrate, of the glass tank, the platform is moved up and moved down to cure a second layer of the synthetic barrier material. Similarly, uniform thin cured layers are achieved by moving the platform. Notably, the synthetic barrier material is photocured to obtain the synthetic barrier film. Optionally, an intensity of the light emitted from the light source may be 3.16 milliwatts centimetre$^{-2}$ (mW/cm$^2$). Optionally, an optical microelectromechanical system (MEMS) of Digital Micromirror Device (DMD) light projection system, forming core of a trademarked DLP projection technology of Texas Instruments, may be used. The DMD light projection system comprises several thousands of microscopic mirrors arranged on surface thereof. Each of the mirrors is configured to individually rotate by a ±10-12° to an 'ON' or 'OFF' state. In the 'ON' state, the MEMS of DMD reflect light from the light source into the plurality of mirrors thereby making pixels appear bright. In the 'OFF' state, the light is directed elsewhere, for example a heat sink, thus resulting in darkness in pixels. Alternatively, a range of digital light processing systems may be used for photocuring. Alternatively, optionally, lasers may be used for photocuring.

Moreover, the synthetic barrier film may be used for various applications such as packaging materials, biomedical industries, construction and so forth. The packaging materials, such as sachets, pouches, bottles, containers and so forth manufactured using the synthetic barrier film possess mechanical strength and high barrier properties, and therefore provides protection to content, such as a liquid, a food item and the like, stored therein. Moreover, the packaging materials manufactured using the synthetic barrier film is crack resistant due to the aligned graphene nanoplatelets in the synthetic barrier film. The three-dimensional (3D) printed packaging material is lightweight and durable. Optionally, the 3D printed packaging material comprises 1.06 g/cm$^3$ of aligned graphene nanoplatelets, that imparts the packaging material with excellent mechanical properties. Therefore, the packaging material may be manufactured with less quantity of synthetic barrier film, thereby reducing the overall thickness thereof.

Optionally, 2% by weight aligned graphene nanoplatelets form bridges that lead to stress distribution at the joint area between the aligned graphene nanoplatelets and the polymer matrix to carry load instead of promoting macroscopic crack advancement through the packaging material. Furthermore, the synthetic barrier materials contain covalent bonding, hydrogen bonding and a rr-rr interaction to synergistically bridge the aligned graphene nanoplatelets for enhanced biomechanical properties. Moreover, 3-D printed lightweight, smart armour aligned graphene nanoplatelets may be used to sense surface damage to exert resistance change during electrical applications, thereby adding intelligence or self-sensing capabilities to the synthetic barrier materials. Furthermore, the self-sensing capabilities of the synthetic barrier materials is provided by the observed changes in electrical resistance.

It has been found that synthetic barrier materials of the disclosure have enhanced fracture toughness. The fracture toughness is the capability of a material with existing cracks to resist fracture. The fracture toughness is a critical mechanical property of interest because it determines the structural integrity and reliability of a material. The synthetic barrier materials of the disclosure exhibit stable crack arrest and deflection, due to the bridging and interlocking of the brick-like aligned graphene nanoplatelets. Consequently, the dissipated energy is increased and composites comprising aligned graphene nanoplatelets are toughened.

Furthermore, the polarically aligned graphene nanoplatelets are able to function as sensors of surface damage of the packaging material, when used in conjunction with an electrical resistance determining device. Such surface damage may lead to structural failure of the packaging material. However, an electrical resistance change in the packaging material results. Such self-sensing capability of the packaging material is beneficial where integrity of sealing, leaks, cracks, deformation detection or tamper-proofing is desired.

DETAILED DESCRIPTION OF DRAWINGS

Referring to FIG. 1, shown is a schematic illustration depicting alignment of graphene nanoplatelets in photocurable resin 102 upon application of electric field to obtain an aligned graphene nanoplatelet resin 108, in accordance with an embodiment of the present disclosure. The aligned graphene nanoplatelet resin 108 comprises a photocurable resin 102 and graphene nanoplatelets, such as the graphene nanoplatelets 104 and 106, wherein the graphene nanoplatelets are polarically aligned in the photocurable resin 102. As shown, a composite mixture 100 comprises graphene nanoplatelets, such as graphene nanoplatelets 104 and 106, in random orientations. Subsequently, upon application of electric field across the composite mixture 100, the graphene nanoplatelets are polarically aligned to obtain the aligned graphene nanoplatelet resin 108. As shown, once subjected to the electric field, the graphene nanoplatelets, such as the graphene nanoplatelets 104 and 106, are parallelly aligned in the photocurable resin 102, so as to imitate a brick and mortar architecture, where the photocurable resin 102 acts as the mortar, and the graphene nanoplatelets act as the bricks. Once in this configuration the photocurable resin is cured to polymerize it and set the position of the graphene nanoplatelets in a synthetic barrier material.

Figure 2:
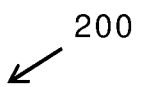
FIG. 2 is a schematic illustration of structure of a graphene nanoplatelet, in accordance with an embodiment of the present disclosure.
Figure 2:
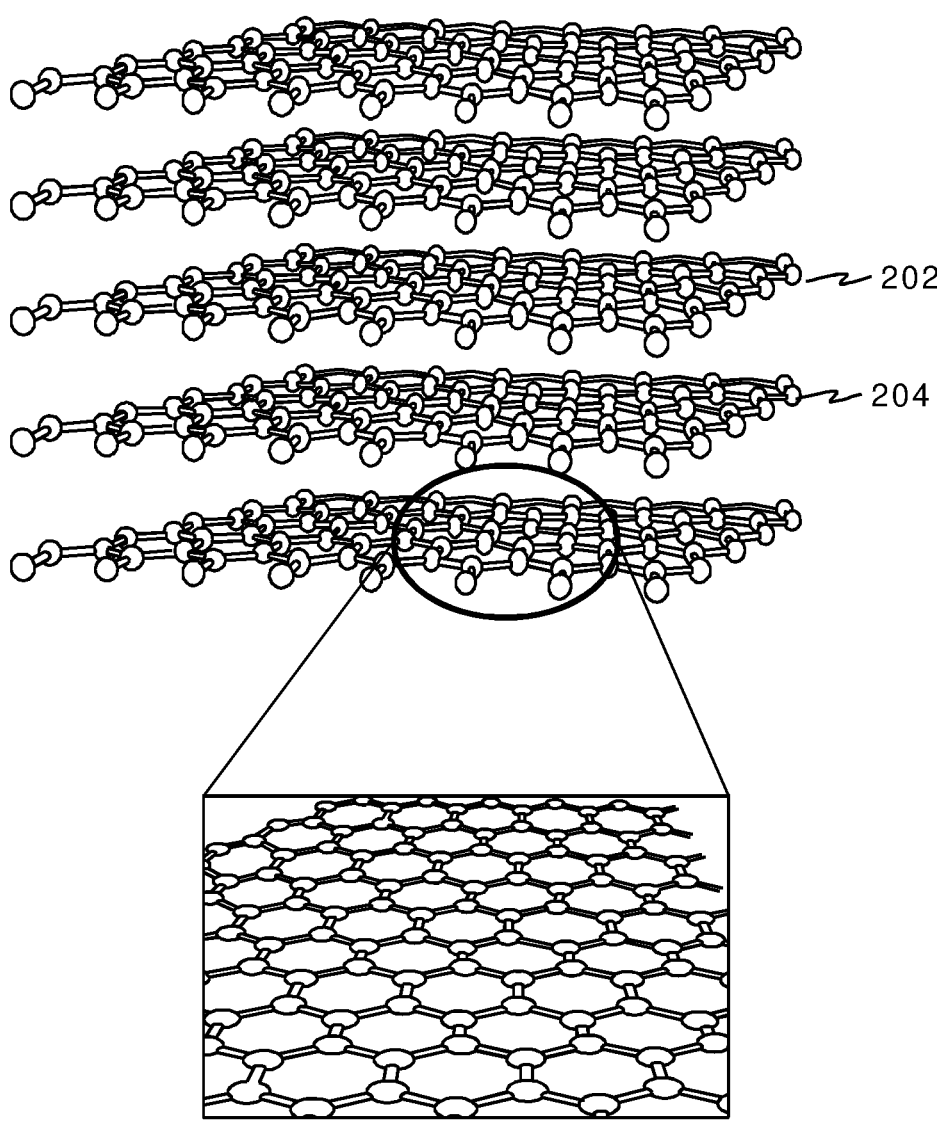

Referring to FIG. 2, shown is a schematic illustration of structure of a graphene nanoplatelet 200, in accordance with an embodiment of the present disclosure. As shown, the graphene nanoplatelets 200 are comprised of short stacks of platelet-shaped graphene sheets, such as the graphene sheets 202 and 204 (arranged in a planar form). Furthermore, as shown in the enlarged view of a graphene sheet, a hexagonal lattice shaped structure (namely, honeycomb shaped) of carbon atoms is observed therein, wherein the hexagonal lattice comprises a carbon atom on each of the six vertices of the hexagon. In particular, carbon atoms in the a given graphene sheet are bonded covalently, with only three of the four valence electrons shared with adjacent carbon atoms. Moreover, each of the graphene sheet may exhibit weak van der Wall attraction towards its neighbouring graphene sheets. Typically, the graphene nanoplatelets have a thickness of 8 nm and a diameter of 25 μm.

Referring to FIG. 3, shown is illustration of steps of a method of manufacturing a synthetic barrier material, in accordance with an embodiment of the present disclosure. The composite mixture comprises a photocurable resin and graphene nanoplatelets. At a step 302, the graphene nanoplatelets are dispersed in the photocurable resin. At a step 304, an electric field is applied to polarically align the graphene nanoplatelets in the photocurable resin. Further to this method, a light source is directed at the resin to cause it to cure by polymerization. Preferably, the light source is an ultraviolet light source. This sets the architecture of the graphene nanoplatelets, allowing the electric field to be disconnected.

The steps 302 and 304 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

EXPERIMENTAL

Materials and Method of Manufacture:

Virgin graphene nanoplatelets were dispersed in of 10N sulphuric acid (30 ml) in the presence of potassium dichromate (1 g) for 1 hour at 80° C. The treated virgin graphene nanoplatelets were filtered and washed with hot water and cold water alternatively several times to remove chromic acid resulting from the reaction of ingredients. The filtered and washed virgin graphene nanoplatelets were then dried in oven at a temperature of 90° C.

The dried filtered graphene nanoplatelets were dispersed in water. 3-amino-n-propyltriethoxysilane was dissolved in acetone and an aliquot of 0.5 ml of this solution added to the graphene nanoplatelet dispersion. The resulting dispersion was stirred for 1 hour at a temperature of 80° C., then filtered and washed with acetone. The collected particles were dried and used as grafted graphene nanoplatelets.

A photocurable resin (G+® resin from Maker Juice Labs, notated MJ, containing high tensile epoxy diacrylate, glycol diacrylate and a photo-initiator) was sourced and the grafted graphene nanoplatelets dispersed at a concentration of 2.0 weight % (1.06 volume %) to provide a resin with graphene.

A 3D printing process was carried out in accordance with this disclosure, setting down a layer of the resin with graphene and light-curing the layer in situ. The resin with graphene in a liquid form was spread over a glass substrate. The graphene nanoplatelets, were dispersed in the photocurable resin spread over the platform. An electric field was applied across the 3 cm width of the printing chamber, i.e. horizontally, by applying 1300 Volts. This resulted in an electric field of 433 V/cm and caused the graphene nanoplatelets to align, such that the platelets were in a horizontal plane.

Subsequently, the aforementioned process was iterated to obtain multiple layers of photocurable resin with polarically aligned graphene nanoplatelets. The resulting synthetic barrier material was cut to size for testing.

In addition to the Aligned GN sample manufactured as above, comparative samples were tested. These were made with the same polymer but without graphene nanoplatelets (Pure polymer) and with the graphene nanoplatelets without applying the electric field (Random GN).

Test Method:

The fracture toughness of samples using three-point bending tests.

samples size: 25 mm×5 mm×5 mm; notch depth: 3 mm

Results:

| | Pure polymer | Random GN | Aligned GN |
|---|---|---|---|
| Fracture toughness (MPa m$^{1/2}$) | 0.74 | >0.74 | 1.59 |
| Observations | exhibits a purely linear elastic response until a catastrophic failure occurs. The corresponding fracture surface showed no crack deflection | progressive failure occurs because of stable crack propagation and the related increment of fracture toughness | stable crack arrest and deflection, showed bridging and interlocking that translated to an increase in dissipated energy and toughening. Greater electrical conductivity. |

The invention claimed is:

1. A method of manufacturing a synthetic barrier material, the synthetic barrier material comprising graphene nanoplatelets, wherein the method comprises:

a) dispersing the graphene nanoplatelets in a photocurable resin, wherein the photocurable resin comprises styrenic, acrylic or vinylic monomers or oligomers thereof and a photo-initiator, and wherein the photocurable resin comprises epoxy diacrylate and glycol diacrylate; and b) applying an electric field to polarically align the graphene nanoplatelets in the photocurable resin, wherein the graphene nanoplatelets are in parallel alignment in the photocurable resin at a predefined spacing to prevent end-to-end contact between adjacent nanoplatelets; and c) applying a light source to cure the photocurable resin to obtain a light-cured photopolymer in which the graphene nanoplatelets have been dispersed and polarically aligned;

wherein the graphene nanoplatelet has a thickness in a range of 5-10 nanometers and a diameter in a range of 15-50 micrometers, and the synthetic barrier material has a graphene nanoplatelets content in the range of 1 to 5% by weight relative to the weight of the synthetic barrier material, wherein the graphene nanoplatelets comprise a grafted functionalized alkyl silyl group, wherein the graphene nanoplatelets are aligned within the light-cured photopolymer at a predefined spacing, such that the graphene nanoplatelets form parallel, closely packed layers structurally separated by the light-cured photopolymer, thereby forming a brick-and-mortar architecture in which the graphene nanoplatelets act as the bricks and the light-cured photopolymer acts as the mortar.

2. The method of manufacturing a synthetic barrier material of claim 1, wherein successive layers of synthetic barrier material are built up by repetition of steps a) to c).

3. The method of manufacturing a synthetic barrier material of claim 2, wherein the method further comprises pre-treating the virgin graphene nanoplatelets using a chemical treatment process, and wherein the graphene nanoplatelets comprise the grafted functionalized alkyl silyl group, and wherein the chemical treatment process comprises:

treating virgin graphene nanoplatelets with a mineral acid, in the presence of an oxidizing agent for pre-determined time period at pre-determined temperature;

filtering the treated virgin graphene nanoplatelets;

dispersing the filtered graphene nanoplatelets in water to obtain a nanoplatelet suspension;

dissolving a functionalized alkyl silane ester in water-soluble non-aqueous solvent to obtain a silane solution; and combining the nanoplatelet suspension with the silane solution to obtain graphene nanoplatelets comprising the grafted functionalized alkyl silyl group.

4. The method of manufacturing a synthetic barrier material of claim 3, wherein the mineral acid is nitric acid.

5. The method of manufacturing a synthetic barrier material of claim 3, including an oxidizing agent wherein the oxidizing agent is potassium dichromate.

6. The method of manufacturing a synthetic barrier material of claim 3, wherein the mineral acid is sulphuric acid.

7. The method of manufacturing a synthetic barrier material of claim 3, wherein the functionalized alkyl silane ester is functionalized with a group selected from —OH or NH2.

8. The method of manufacturing a synthetic barrier material of claim 3, wherein the alkyl group of the functionalized alkyl silane ester comprises a C2 to C5 linear alkyl group.

9. The method of manufacturing a synthetic barrier material of claim 3, wherein the functionalized alkyl silane ester is 3-amino-n-propyltriethoxysilane.

10. The method of manufacturing a synthetic barrier material of claim 1, wherein the photo-initiator is selected from group consisting of organic peroxides, azo-dyes, cationic onium salts.

11. The method of manufacturing a synthetic barrier material of claim 1, wherein the method comprises generating the electric field by using a direct-current voltage, and wherein the electric field generated is in the range 100 to 1000 Volts/centimeter.

12. The method of claim 1, wherein the graphene nanoplatelet has a diameter in a range of 15-20 micrometers.

* * * * *